(12) United States Patent
Westerink et al.

(10) Patent No.: US 9,004,590 B2
(45) Date of Patent: Apr. 14, 2015

(54) DISPLAY ASSEMBLY WITH LIGHTING APPARATUS

(75) Inventors: Rik Westerink, Corinth, TX (US); Timothy W. Terleski, Richardson, TX (US); Per Magnus Skold, McKinney, TX (US); Alexander Gerard Saucier, Addison, TX (US); Armando Valdes, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 275 days.

(21) Appl. No.: 13/311,053

(22) Filed: Dec. 5, 2011

(65) Prior Publication Data

US 2012/0139308 A1     Jun. 7, 2012

Related U.S. Application Data

(60) Provisional application No. 61/459,148, filed on Dec. 7, 2010.

(51) Int. Cl.
*A47C 31/00* (2006.01)
*B64D 11/00* (2006.01)
*B64D 11/06* (2006.01)

(52) U.S. Cl.
CPC ............ *B64D 11/0015* (2013.01); *B64D 11/06* (2013.01); *B64D 2011/0053* (2013.01)

(58) Field of Classification Search
USPC .......................................... 297/217.3, 217.6
See application file for complete search history.

(56) References Cited

U.S. PATENT DOCUMENTS

| 5,640,297 | A  | * | 6/1997 | Labaze ..................... 361/679.55 |
| 6,394,551 | B1 | * | 5/2002 | Beukema ...................... 297/391 |
| 6,929,218 | B1 |   | 8/2005 | Sanford et al. |
| 2004/0099766 | A1 |   | 5/2004 | Pratt |
| 2008/0136230 | A1 | * | 6/2008 | Ling .......................... 297/217.6 |
| 2009/0108649 | A1 | * | 4/2009 | Kneller et al. ............. 297/217.6 |
| 2010/0097408 | A1 | * | 4/2010 | Marcellinus et al. ......... 345/690 |
| 2010/0162327 | A1 | * | 6/2010 | Bonar .............................. 725/77 |
| 2010/0171888 | A1 | * | 7/2010 | Saenz et al. ................... 348/739 |

FOREIGN PATENT DOCUMENTS

DE     102008009138     8/2009

OTHER PUBLICATIONS

International Search Report and Written Opinion dated Jun. 5, 2012 in related Application No. PCT/US2011/063265.

* cited by examiner

*Primary Examiner* — Philip Gabler
(74) *Attorney, Agent, or Firm* — Kilpatrick Townsend & Stockton LLP; Dean W. Russell, Esq.; Tiffany L. Williams, Esq.

(57) ABSTRACT

Described are display assemblies having a display coupled to a passenger seat back, a video shroud coupled to the passenger seat back and with an inner opening positioned adjacent the display, wherein a gap is positioned between an outer edge of the display and an edge of the inner opening, and a light apparatus having at least one lighting element coupled to the passenger seat back, wherein the at least one lighting element is positioned to emit light through the gap. The display assembly may also include a diffuser coupled to the video shroud and positioned adjacent the gap.

27 Claims, 3 Drawing Sheets

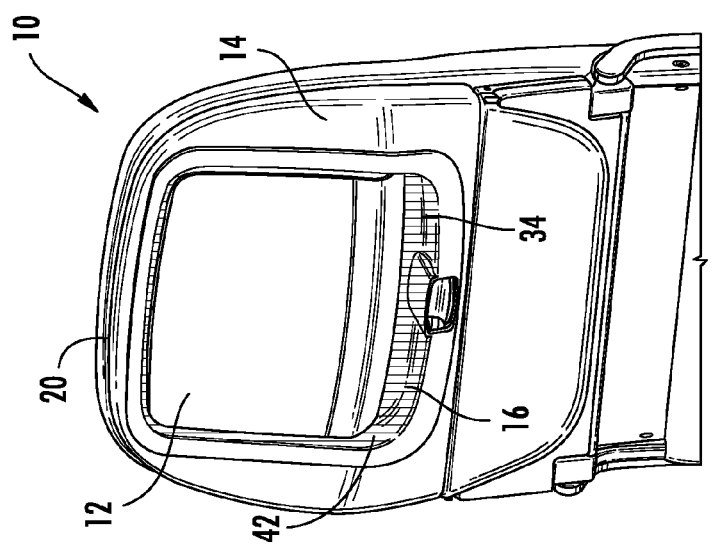
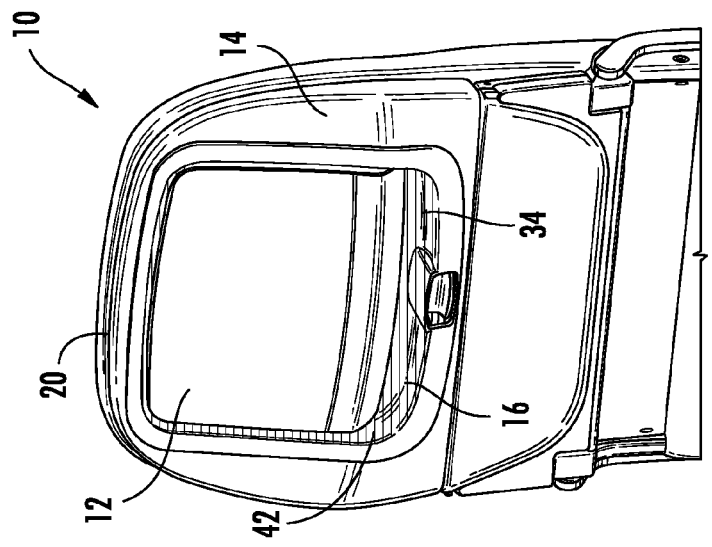
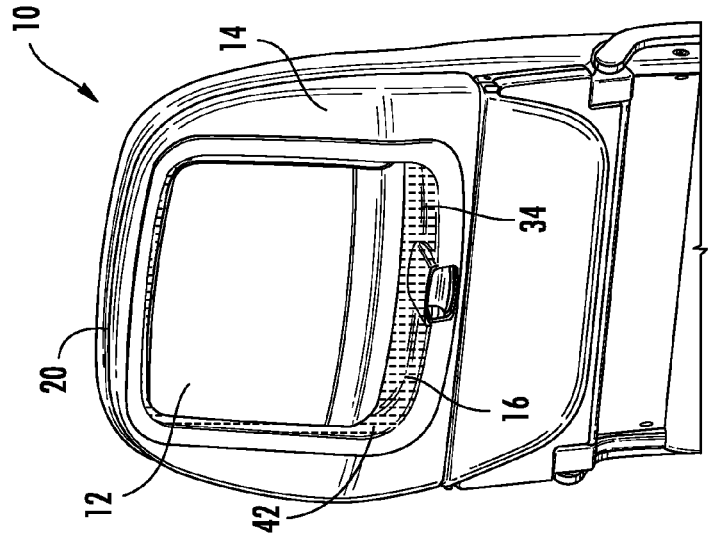

DISPLAY ASSEMBLY WITH LIGHTING APPARATUS

CROSS REFERENCE TO RELATED APPLICATION

This application is related to and claims priority benefits from U.S. Provisional Application Ser. No. 61/459,148, filed on Dec. 7, 2010, entitled MOOD LIGHTING FOR BACK MOUNTED MONITOR. The '148 application is hereby incorporated herein in its entirety by this reference.

FIELD OF THE INVENTION

The invention relates to passenger seats or the like.

BACKGROUND

Skillful application of lighting has been found to influence the experience of a viewer. Thus, light is an element of design that may be used to provide visual comfort, as well as to achieve emotional responses from the lighted environment. Through use of lighting patterns of varying levels of illumination and color, it is possible to produce certain moods, such as solemnity, restfulness, gaiety, activity, warmth, and coolness.

With the advent of technology in lighting devices, it is possible to achieve different levels of light and color in a controlled and predictable manner. Lighting technology is commonly used on many consumer devices to enhance a user's experience.

Because mood lighting is often best used in a controlled environment, aircraft or vehicle cabins may provide an environment where mood lighting may enhance a passenger's experience. Specifically, it may be desirable to incorporate mood lighting into areas that are most often viewed by passengers, such as passenger seat backs. Many passenger seat backs are often used to install In-Flight Entertainment ("IFE") equipment or other entertainment devices and/or as an area for additional storage of amenities, such as reading materials or other devices. Thus, it may be desirable to combine mood lighting with these amenities to provide an overall entertaining and aesthetically pleasing environment for passengers.

SUMMARY

Embodiments of the present invention include a display assembly comprising a display coupled to a passenger seat back, a video shroud coupled to the passenger seat back and comprising an inner opening positioned adjacent the display, wherein a gap is positioned between an outer edge of the display and an edge of the inner opening, and a light apparatus comprising at least one lighting element coupled to the passenger seat back, wherein the at least one lighting element is positioned to emit light through the gap. Other embodiments may further include a passenger seat comprising the passenger seat back.

In some embodiments, the lighting element comprises at least one light source that is configured to direct light toward a passenger's lap. At least one of color, intensity, or pattern of light emitted from the lighting element may be adjustable. In other embodiments, a controller may be connected to the lighting element, which is configured to adjust at least one of color, intensity, or pattern of light emitted from the lighting element. The color, intensity, or pattern of light emitted from the lighting element may be adjusted based on detection of unsafe conditions.

In some embodiments, the display assembly may further comprise a diffuser coupled to the video shroud and positioned adjacent the gap. The diffuser may be translucent, as well as colored.

BRIEF DESCRIPTION OF THE DRAWINGS

FIG. 3 is a perspective view of the display assembly of FIG. 1 emitting an alternate color.

FIG. 4 is a perspective view of the display assembly of FIG. 1 emitting another alternate color.

FIG. 5 is a perspective view of the display assembly of FIG. 1 emitting yet another alternate color.

DETAILED DESCRIPTION

Figure 1:
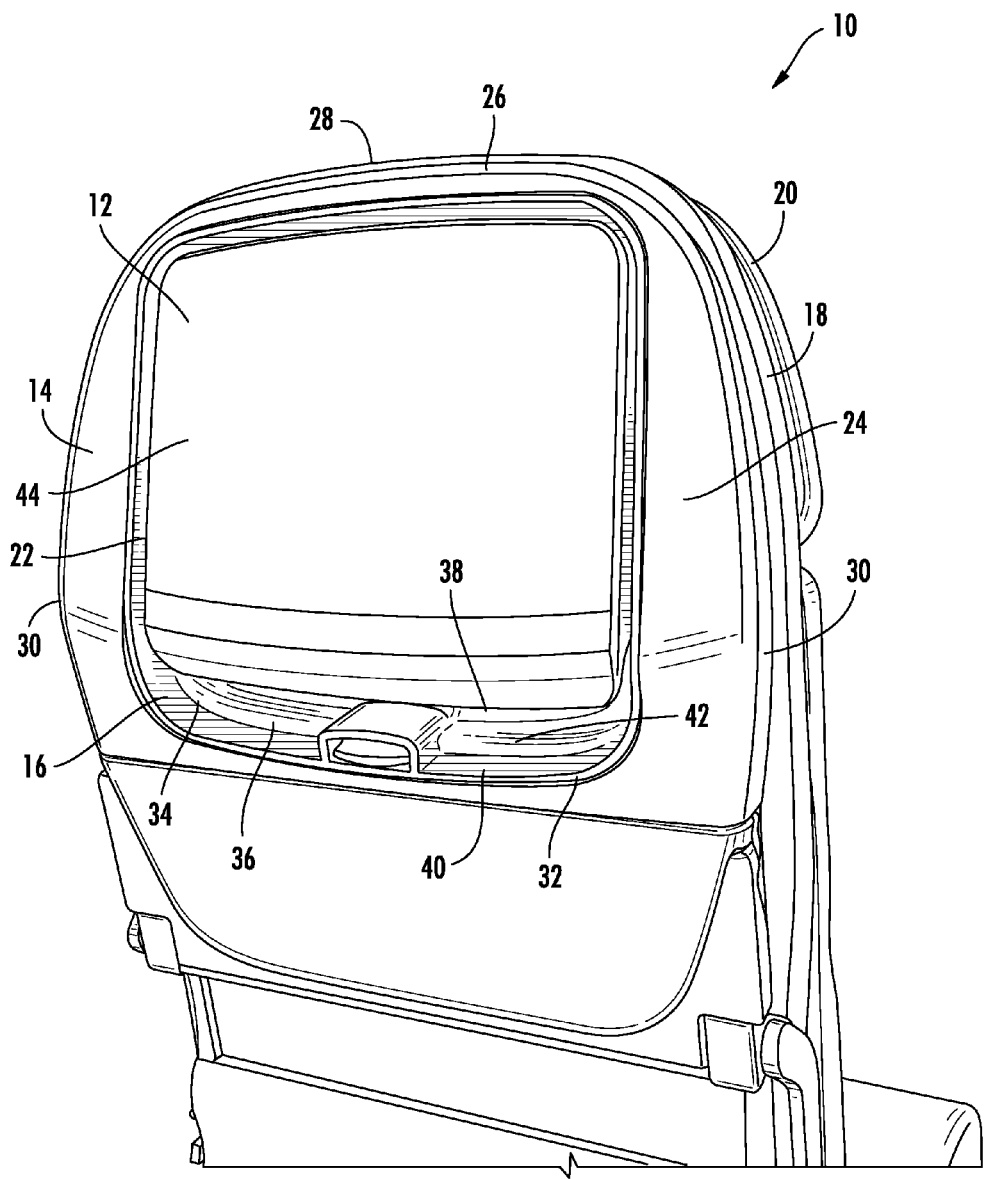
FIG. 1 is a perspective view of a display assembly according to certain embodiments of the present invention.

The described embodiments of the invention provide display assemblies for use with passenger seats. While the display assemblies are discussed for use with aircraft seats, they are by no means so limited. Rather, embodiments of the display assemblies may be used in passenger seats or other seats of any type or otherwise as desired.

FIGS. 1-5 illustrate embodiments of a display assembly 10. In these embodiments, the display assembly 10 comprises a display 12, a video shroud 14, and a light apparatus 16.

The display 12 may be a display for an IFE or other entertainment devices. In some embodiments, the display 12 is coupled to a back 18 of a passenger seat 20. One of ordinary skill in the relevant art will understand that any suitable coupling technique may be used to attach the display 12 to the back 18 including but not limited to mechanical fasteners such as screws, bolts, rivets, compression fit, or other suitable fasteners.

The display 12 may comprise any suitable outer perimeter shape 22 including but not limited to square, rectilinear, trapezoidal, parabolic, or other suitable shape that does not exceed an outer perimeter 28 of the back 18. In certain embodiments, the back 18 may include a recess that is shaped to accommodate the outer perimeter shape 22 of the display 12 and at least a portion of a depth of the display 12.

As shown in FIGS. 1-5, embodiments of the video shroud 14 may be coupled to the back 18. One of ordinary skill in the relevant art will understand that any suitable coupling technique may be used to attach the video shroud 14 to the back 18 including but not limited to mechanical fasteners such as screws, bolts, rivets, compression fit, or other suitable fasteners. The video shroud 14 may include a surface 24 having an outer perimeter shape 26 that corresponds to at least a portion of the outer perimeter 28 of the back 18. The video shroud 14 includes sides 30 that are shaped so that the surface 24 of the video shroud 14 is positioned adjacent and/or aft of the display 12.

The video shroud 14 may be formed of a material that resists stains and is easily and quickly sanitized between passenger uses including but not limited to plastics, such as polycarbonate, polyethylene, polypropylene, polyvinyl chloride, or other similar plastics, metallic materials, composite materials, or other similar materials.

The video shroud 14 may also comprise an inner opening 32. The inner opening 32 may be shaped so that the display 12 is visible through the video shroud 14. Thus, as shown in FIGS. 1-5, the inner opening 32 may have any suitable shape that substantially surrounds the display 12. In some embodiments, the inner opening 32 may be larger than the outer perimeter shape 22 of the display 12 so that a gap 36 is positioned between an outer edge 38 of the display 12 and an edge 40 of the inner opening 32.

Embodiments of the light apparatus 16 may be coupled to the back 18, the display 12, and/or the video shroud 14. For example, in the embodiments shown in FIGS. 1-5, the light apparatus 16 may include at least one lighting element 34 that may be coupled to the back 18 adjacent the display 12, behind the display 12, and/or behind the video shroud 14. The lighting element 34 may include at least one conventional light source and/or light emitting diode ("LED"), such as single-die or multi-die LEDs, organic LEDs, white LEDs, and color or multicolor LEDs.

The light apparatus 16 may also include a diffuser 42 that is positioned adjacent the lighting element 34. The diffuser 42 may be formed of a translucent material, wherein the translucent may be clear, white, colored, or any combination thereof. One of ordinary skill in the relevant art will understand that the diffuser 42 may be formed of any suitable plastic or glass material that allows the light emitted from the lighting element 34 to be visible by the passenger in an aesthetically pleasing manner.

In the embodiments where the lighting element 34 is positioned adjacent the display 12, the diffuser 42 may be shaped to substantially surround at least the outer edge 38 of the display 12. In some embodiments, the diffuser 42 may also have a width that spans the gap 36 between the display 12 and the inner opening 32 of the video shroud 14. In the embodiments where the lighting element 34 is positioned behind the display 12, a portion of the display 12 itself may be formed of a translucent material so that a separate diffuser 42 is not required (i.e., the diffuser 42 is integrated into the display 12) or the light emitted from the lighting element 34 may be reflected around the edges of the display 12. In the embodiments where the lighting element 34 is positioned behind the video shroud 14, the video shroud 14 may be formed of a translucent material so that a separate diffuser 42 is not required (i.e., the diffuser 42 is integrated into the video shroud 14) or the light emitted from the lighting element 34 may be reflected around the edges of the video shroud 14. Incorporating light around the display 12 may enhance a passenger's enjoyment and/or may make the display 12 easier to view.

One of ordinary skill in the relevant art will understand that any suitable coupling arrangement may be used to attach the diffuser 42 to the display 12 and/or the video shroud 14 including but not limited to mechanical fasteners such as screws, bolts, rivets, compression fit, chemical fasteners, or other suitable fasteners.

In certain embodiments, as shown in FIGS. 1-5, the lighting element 34 may be powered by the IFE system or may have a separate source of power. The output of the lighting element 34 may be adjusted with a controller 44, which is electronically connected to the lighting element 34 so that an output from the controller 44 adjusts the lighting element 34. Thus, as illustrated in FIGS. 1-5, the controller 44 may be used to change the light color and/or intensity and/or create patterns in the light emission (i.e., blinking, flashing) to convey different moods and atmospheres to passengers. The controller 44 may be configured to adjust each lighting element 34 individually, by group of elements within individual passenger seat 20, by individual passenger seat 20 or in groups based on rows, sections, or an entire aircraft or vehicle.

Figure 2:
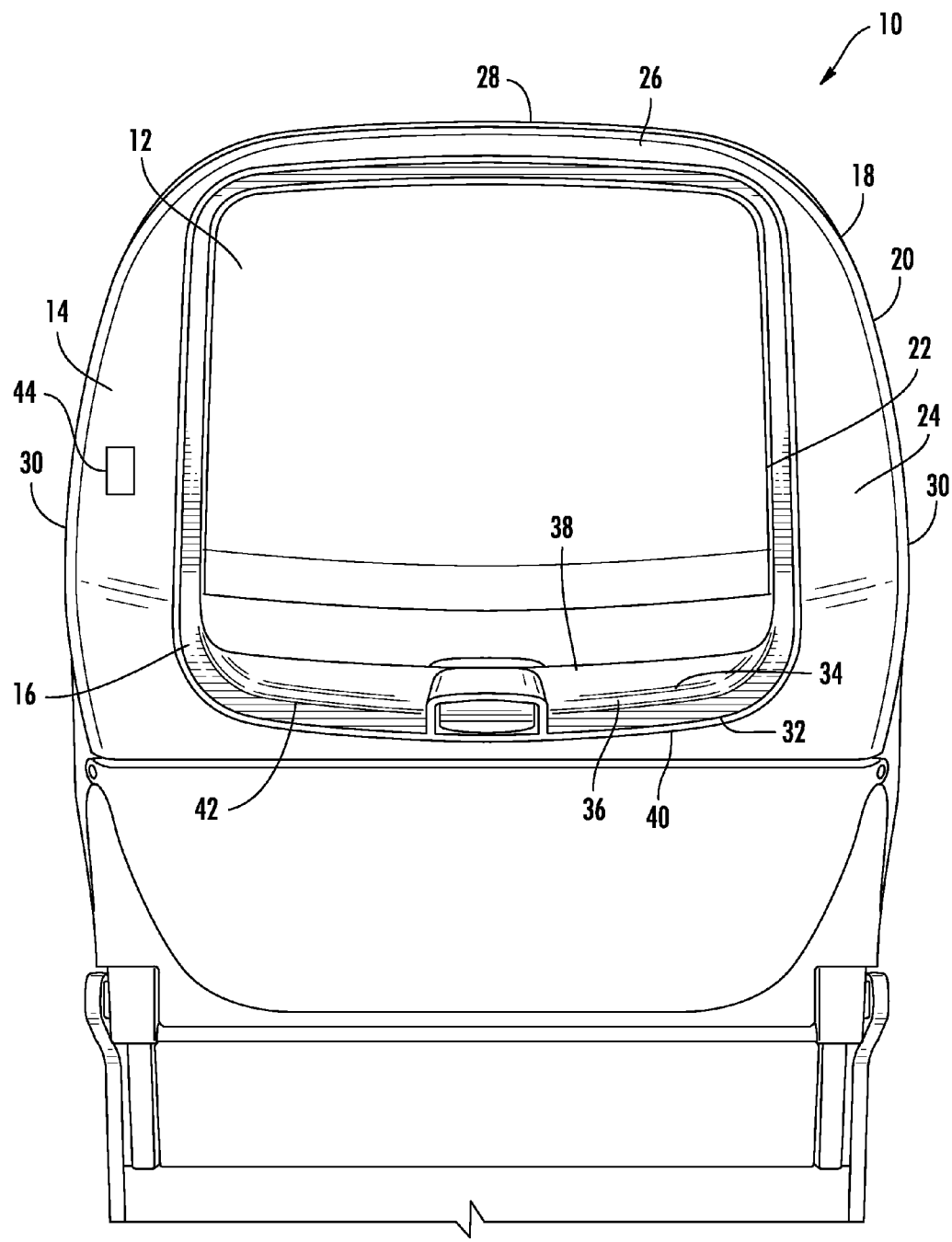
FIG. 2 is a front view of the display assembly of FIG. 1.

In some embodiments, the controller 44 may be configured to adjust the lighting element 34 based on manual input from passengers or personnel. The controller 44 may be positioned within the back 18 and/or the video shroud 14 (as shown in FIG. 2) or may be incorporated as a touch screen within the display 12 (as shown in FIG. 1) for the passenger's use and/or may be positioned within the aircraft or vehicle in a location convenient for use by aircraft or vehicle personnel or operator.

Additionally or alternatively, the controller 44 may be configured to operate the lighting element 34 as a communication tool based on signals received from the aircraft or vehicle control system. For example, the controller 44 may be used to change the light color and/or intensity and create patterns in the light emission (i.e., blinking, flashing) based on various events occurring during transport (such as takeoff, cruising altitude, beverage service, meals, landing, etc.), activities within the aircraft or vehicle (sleeping, reading, watching a movie, etc.) and/or the presence of unsafe conditions (turbulence, improper use of electronic devices, seat backs not upright, tray tables not stowed, etc.). One of ordinary skill in the relevant art will understand that these are but a few examples of how the lighting apparatus 16 may be configured as a communication tool.

In certain embodiments, the light apparatus 16 may also be configured as a reading light by adjusting the light apparatus 16 to direct light toward a passenger's lap. In these embodiments, the lighting element 34 and/or the diffuser 42 may be pivotally coupled to the back 18, the display 12, or the video shroud 14 so that a passenger may adjust the direction of the light emitted by the light apparatus 16. The lighting element 34 may also include at least one light source and/or LED that is configured to direct light toward a passenger's lap, so that the light source and/or LED illuminates when a passenger actuates the reading light switch. In other embodiments, the light source and/or LED may be surrounded by an adjustable diffuser 42 that automatically rotates to direct light toward a passenger's lap when a passenger actuates the reading light switch.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A display assembly comprising:
   (a) a display pivotally coupled to a passenger seat back;
   (b) a video shroud coupled to the passenger seat back and comprising an inner opening positioned adjacent the display, wherein a gap is formed between the display and the inner opening; and
   (c) a light apparatus comprising at least one lighting element fixedly coupled to the passenger seat back behind the display, wherein the at least one lighting element is positioned to emit light so that the light is reflected around outer edges of the display and through the gap between the display and the inner opening of the video shroud.

2. The display assembly of claim 1, wherein a color of light emitted from the at least one lighting element is adjustable.

3. The display assembly of claim 2, wherein the color of light emitted from the at least one lighting element is adjusted based on detection of unsafe conditions.

4. The display assembly of claim 1, further comprising a controller connected to the at least one lighting element, which is configured to adjust a color of light emitted from the at least one lighting element.

5. The display assembly of claim 4, wherein the color of light emitted from the at least one lighting element is adjusted based on detection of unsafe conditions.

6. The display assembly of claim 1, wherein the light apparatus further comprises a diffuser coupled to the video shroud and positioned adjacent the gap between the display and the inner opening of the video shroud.

7. The display assembly of claim 6, wherein the diffuser surrounds the outer edges of the display.

8. The display assembly of claim 6, wherein the diffuser spans the gap between the display and the inner opening of the video shroud.

9. The display assembly of claim 1, wherein a portion of the video shroud is translucent and acts as a diffuser.

10. A passenger seat comprising:
   (a) a passenger seat back; and
   (b) a display assembly comprising:
      (i) a display pivotally coupled to the passenger seat back;
      (ii) a video shroud coupled to the passenger seat back and comprising an inner opening positioned adjacent the display, wherein a gap is formed between the display and the inner opening; and
      (iii) a light apparatus comprising at least one lighting element fixedly coupled to the passenger seat back behind the display, wherein the at least one lighting element is positioned to emit light so that the light is reflected around outer edges of the display and through the gap between the display and the inner opening of the video shroud.

11. The passenger seat of claim 10, wherein a color of light emitted from the at least one lighting element is adjustable.

12. The passenger seat of claim 11, wherein the color of light emitted from the at least one lighting element is adjusted based on detection of unsafe conditions.

13. The passenger seat of claim 10, further comprising a controller connected to the at least one lighting element, which is configured to adjust a color of light emitted from the at least one lighting element.

14. The passenger seat of claim 13, wherein the color of light emitted from the at least one lighting element is adjusted based on detection of unsafe conditions.

15. The passenger seat of claim 10, wherein the light apparatus further comprises a diffuser coupled to the video shroud and positioned adjacent the gap between the display and the inner opening of the video shroud.

16. The passenger seat of claim 15, wherein the diffuser surrounds the outer edges of the display.

17. The passenger seat of claim 15, wherein the diffuser spans the gap between the display and the inner opening of the video shroud.

18. The passenger seat of claim 10, wherein a portion of the video shroud is translucent and acts as a diffuser.

19. A display assembly comprising:
   (a) a display pivotally coupled to a passenger seat back;
   (b) a video shroud coupled to the passenger seat back and comprising an inner opening positioned adjacent the display, wherein a gap is formed between the display and the inner opening; and
   (c) a light apparatus comprising:
      (i) at least one lighting element fixedly coupled to the passenger seat back behind the display, wherein the at least one lighting element is positioned to emit light so that the light is reflected around outer edges of the display and through the gap between the display and the inner opening of the video shroud; and
      (ii) a diffuser coupled to the video shroud and positioned adjacent the gap between the display and the inner opening of the video shroud.

20. The display assembly of claim 19, wherein a color of light emitted from the at least one lighting element is adjustable.

21. The display assembly of claim 20, wherein the color of light emitted from the at least one lighting element is adjusted based on detection of unsafe conditions.

22. The display assembly of claim 19, further comprising a controller connected to the at least one lighting element, which is configured to adjust a color of light emitted from the at least one lighting element.

23. The display assembly of claim 22, wherein the color of light emitted from the at least one lighting element is adjusted based on detection of unsafe conditions.

24. The display assembly of claim 19, wherein the diffuser is translucent.

25. The display assembly of claim 19, wherein the diffuser is colored.

26. The display assembly of claim 19, wherein the diffuser surrounds the outer edges of the display.

27. The display assembly of claim 19, wherein the diffuser spans the gap between the display and the inner opening of the video shroud.

* * * * *